Figure 3:
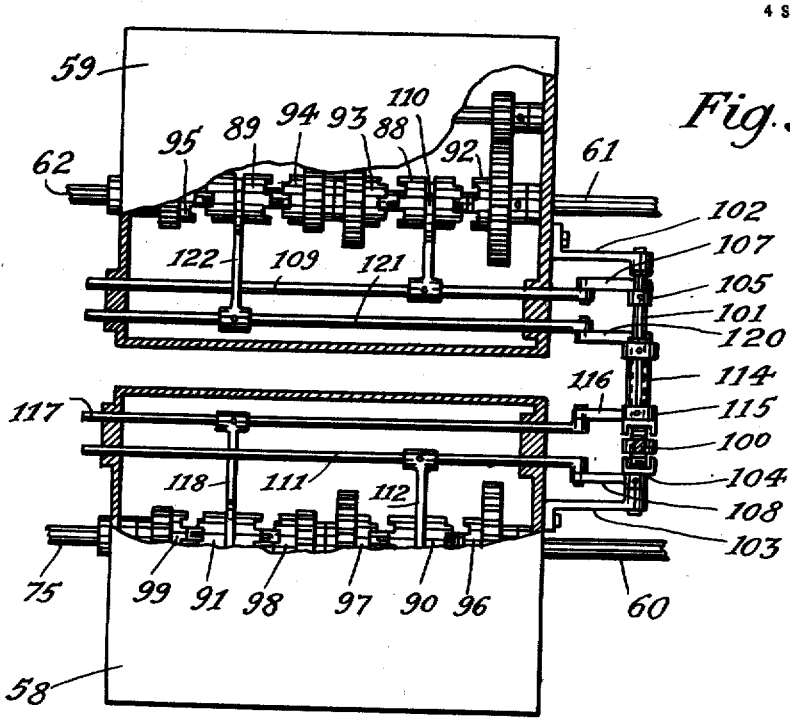

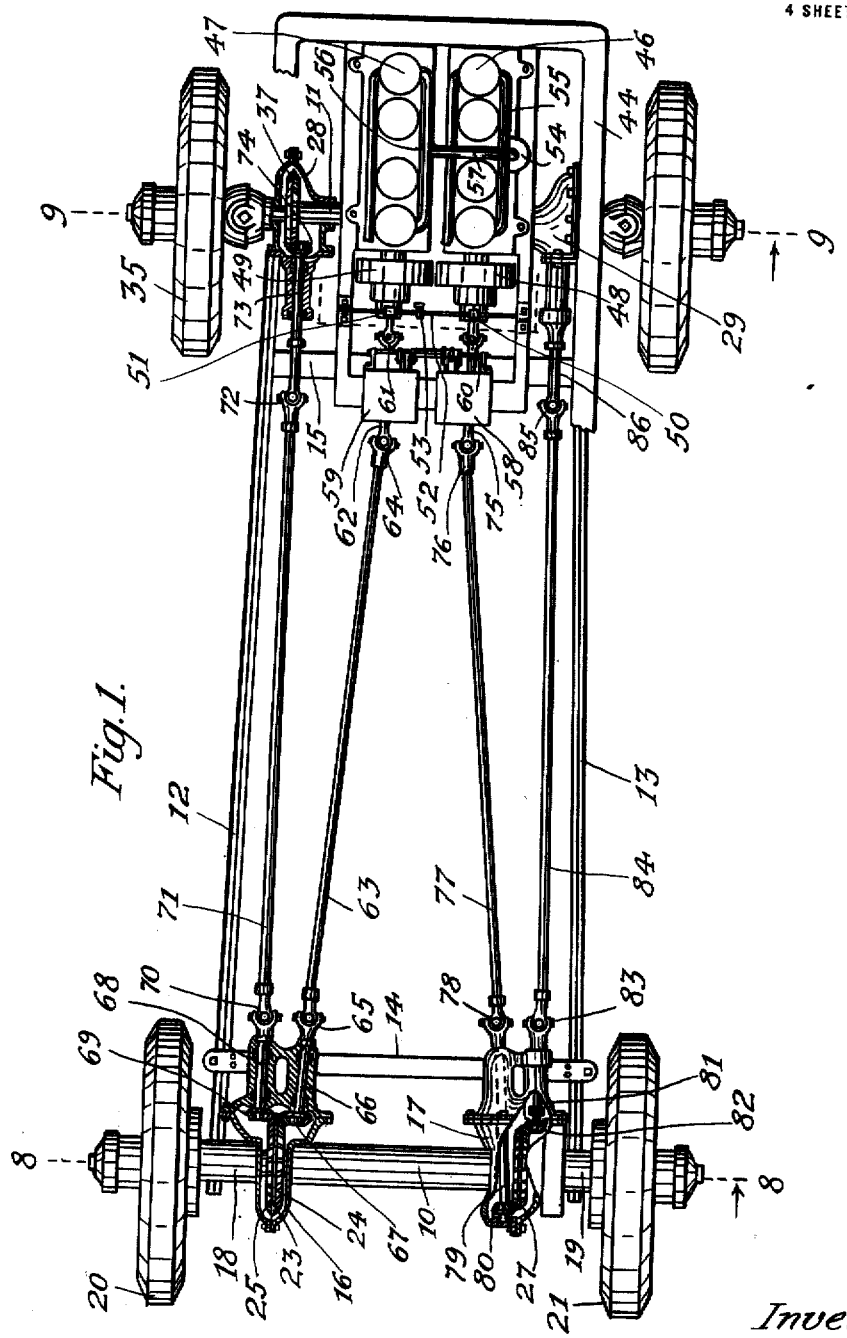

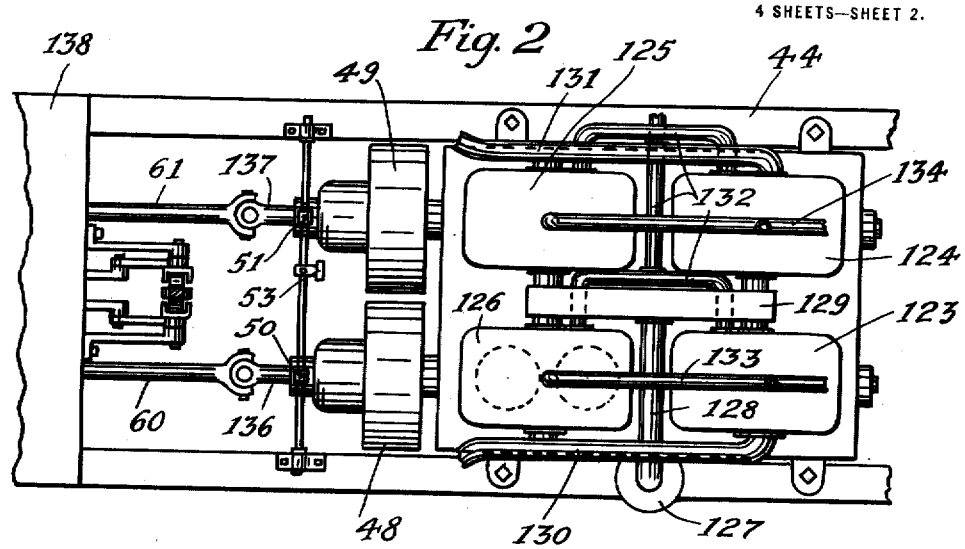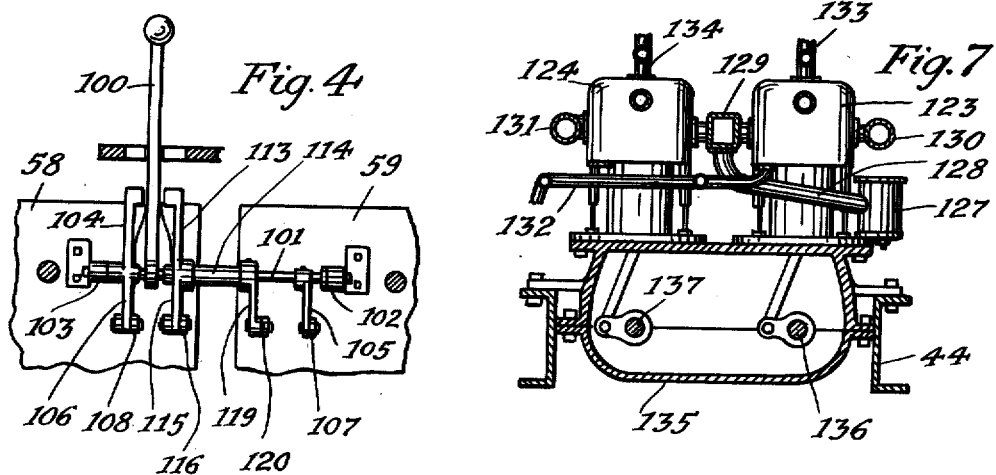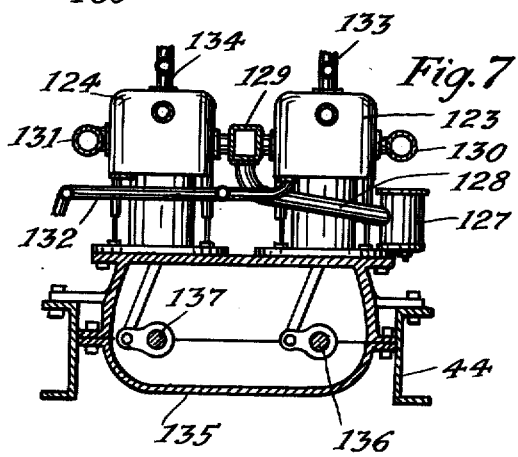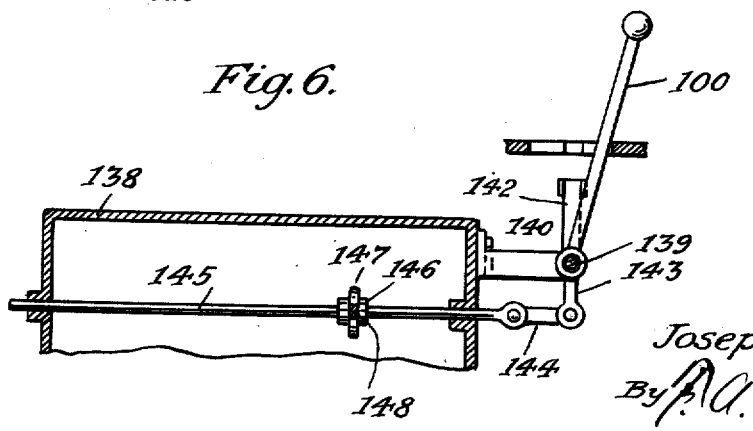

J. L. WARE.
MOTOR VEHICLE.
APPLICATION FILED MAR. 23, 1917.

1,317,841.

Patented Oct. 7, 1919.
4 SHEETS—SHEET 3.

Inventor
Joseph L. Ware
By [signature]
his Attorney.

J. L. WARE.
MOTOR VEHICLE.
APPLICATION FILED MAR. 23, 1917.

1,317,841.

Patented Oct. 7, 1919.
4 SHEETS—SHEET 4.

Inventor
Joseph L. Ware
By P. A. Whiteley
his Attorney.

UNITED STATES PATENT OFFICE.

JOSEPH L. WARE, OF ST. PAUL, MINNESOTA.

MOTOR-VEHICLE.

1,317,841.

Specification of Letters Patent.

Patented Oct. 7, 1919.

Application filed March 23, 1917. Serial No. 156,807.

*To all whom it may concern:*

Be it known that I, JOSEPH L. WARE, a citizen of the United States, residing at St. Paul, in the county of Ramsey and State of Minnesota, have invented certain new and useful Improvements in Motor-Vehicles, of which the following is a specification.

My invention relates to motor vehicles and more particularly to motor vehicles having each of the four wheels thereof driven by a motor.

It is the object of my invention to provide a motor vehicle having a pair of engine units, each of the engine units being provided with driving connections for driving independently and without a differential, the front and rear wheels on one side only of the motor vehicle,—in other words, the right hand motor unit will drive the front right hand and the rear right hand wheels; the left hand motor unit will drive the front left hand and the rear left hand wheels. The two motor units are provided with means for supplying carbureted mixture such that the cylinders for each motor will receive the same mixture in the same proportions, and the two motors, therefore, be driven under the same impulses at the same speed. This has been found in practice to be best effected by providing a single carbureter and manifold passageway and timing the cycle of the two so that explosive mixture goes to the two motors from the same carbureter under consecutively similar conditions under the cycle of operation of the motor. I further provide separate transmissions for each of the motors, said transmissions being simultaneously operable by a single control member, so that both motor units will always operate through corresponding transmission elements to drive the wheels on the respective sides of the vehicle at equal speeds.

The full objects and advantages of my invention will appear more fully in the detailed description thereof, and are particularly pointed out in the claims.

In the drawings illustrating the application of my invention in one form,—

Figure 5:
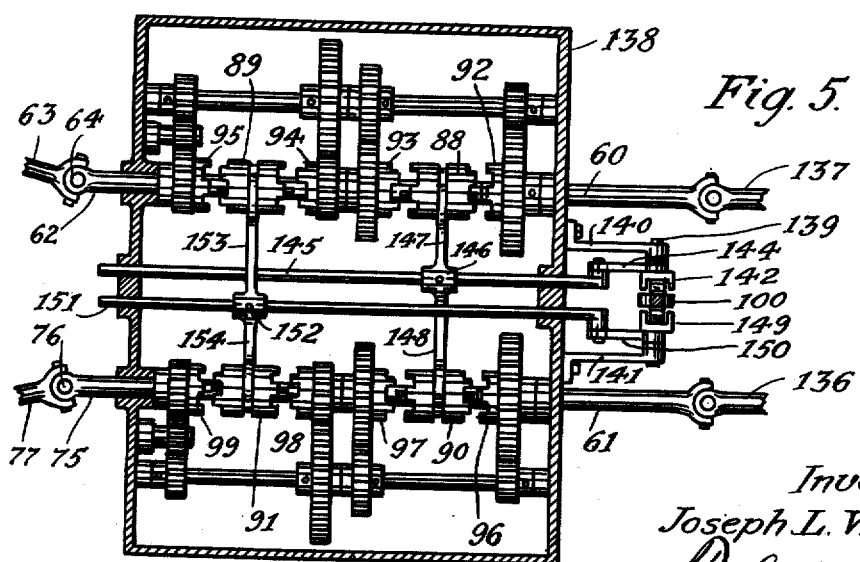
Figure 8:
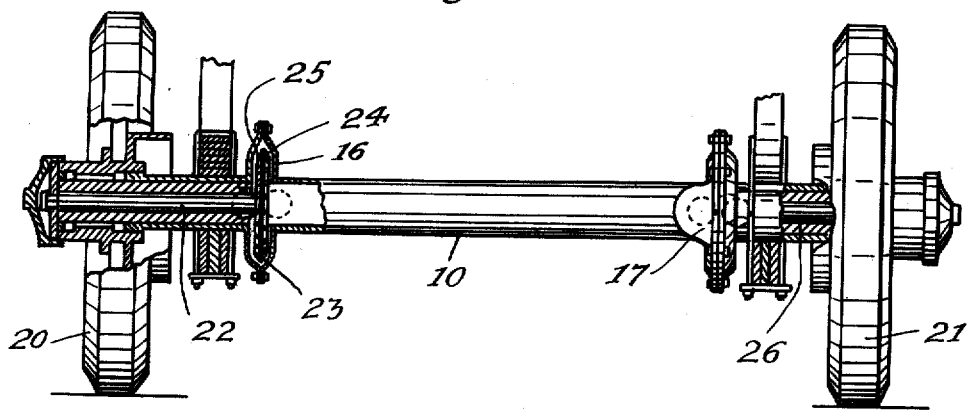
Figure 9:
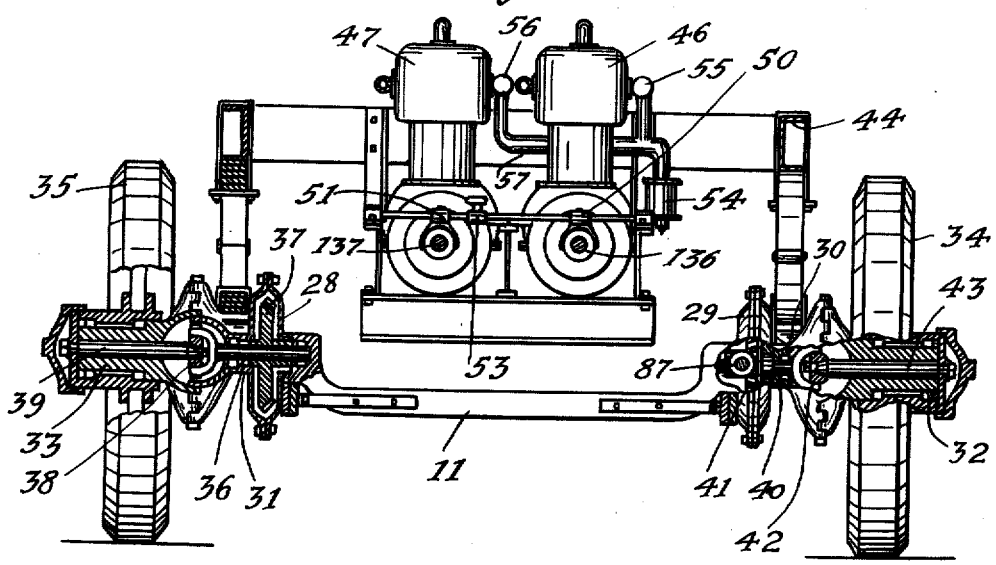

Figure 1 is a plan view of a vehicle embodying my improvements, with some parts broken away and in section. Fig. 2 is a similar view of a part only of an automobile showing a modified arrangement of the parts. Fig. 3 is an enlarged plan view of the transmission box shown in Fig. 1 with parts broken away and in section. Fig. 4 is an end elevation view of parts shown in Fig. 3. Fig. 5 is a plan view of the transmission box, shown in Fig. 2 with the top of casing removed and in section. Fig. 6 is a sectional elevation view of said transmission showing the control lever and connections. Fig. 7 is an end elevation, part sectional view, showing the engine unit shown in Fig. 2. Fig. 8 is a sectional elevation view on line 8—8 of Fig. 1. Fig. 9 is a sectional elevation view on line 9—9 of Fig. 1.

As illustrated and described, having reference first to Fig. 1, a rear axle 10 and front axle 11 are secured in rigid parallel alinement by frame members 12 and 13 preferably reinforced by cross members 14 and 15. The rear axle 10 comprises a tubular housing and two sets of gear housings 16 and 17 of usual construction, side housing members 18 and 19 providing journal bearings for rear wheels 20 and 21. Within housing 18 is a drive shaft 22 having driving connection with wheel 20 and having thereon a drive gear 23 within the gear housing 16, said drive gear being provided with two oppositely disposed gear faces 24 and 25. Similarly, the axle housing 19 is provided with a drive shaft 26 having driving connection with rear wheel 21 and having thereon a double-faced gear 27 within gear housing 17.

The front axle 11 is provided with gear housings 28 and 29 and axle sections 30 and 31 connected therewith. To the axle sections 30 and 31 are pivotally connected steering knuckles 32 and 33 upon which are journaled front wheels 34 and 35. Within axle section 31 is a drive shaft 36 having at one end within housing 28 a drive gear 37 and being connected at the other end by a flexible joint 38 with a driving spindle 39 in steering knuckle 33, which spindle has driving connection with wheel 35. Similarly, within axle section 30 is a drive shaft 40 having on one end within housing 29 a gear 41 and being connected at the other end by flexible joint 42 with a driving spindle 43 which has driving connection with front wheel 34.

A frame 44 is supported upon the parts heretofore described in a well known manner and supports on the front end thereof a pair of engine units 46 and 47 here shown as four-cylinder engine each provided with independent fly-wheels 48 and 49 and independent clutches 50 and 51, said clutches being simultaneously operative from a clutch shaft 52 operated by a clutch lever 53. A single carbureter 54 supplies gas simultaneously to intake manifolds 55 and 56 for the two engine units, a cross pipe 57 connecting said manifolds. A pair of transmission boxes 58 and 59 contains transmission elements adapted to be driven from the respective engine units 46 and 47 by shafts 60 and 61, said sets of transmission elements being simultaneously controlled by means which will hereinafter be described.

From the transmission within casing 59 a drive shaft 62 is connected with a propeller shaft 63 by a universal joint 64 and propeller shaft 63 is, in turn, connected by a universal joint 65 with a short drive shaft 66 journaled in housing 16 and having thereon a drive pinion 67 meshing with gear 24, by which the shaft 22 and rear wheel 20 is driven. Journaled within housing 16 is another short drive shaft 68 having on the end thereof a drive pinion 69 meshing with gear 25. Shaft 68 is connected by universal joint 70 with a propeller shaft 71, which is connected by universal joint 72, with a short drive shaft 73 journaled in housing 28 and having thereon a drive pinion 74 meshing with drive gear 37 by which front wheel 35 is driven.

The above mechanism provides means for driving from the independent engine unit 47 the two wheels 20 and 35 on the left hand side of the vehicle, being one front and one rear wheel on one side of the vehicle.

From the transmission in casing 58 is driven a shaft 75 which is connected by universal joint 76 with a propeller shaft 77. The propeller shaft 77 is connected by universal joint 78 with a short drive shaft 79 journaled in housing 17. The drive shaft 79 has thereon a drive pinion 80 meshing with the inner face of double face gear 27 at a point on said gear diametrically opposite the point on gear 24 at which drive pinion 67 meshes with drive gear 24. The rear wheel 21 is thereby driven in the same direction as rear wheel 20. A short shaft 81 journaled in housing 17 has thereon a drive pinion 82 meshing with the outside face of double-faced gear 27. Shaft 81 is connected by universal joint 83, with a propeller shaft 84 which is connected by universal joint 85 with a short shaft 86 journaled in front housing 29 and having thereon a drive pinion 87 meshing with drive gear 41 by which front wheel 34 is driven. Because of the fact that pinion 82 meshes with the outside face of drive gear 27 at a point diametrically opposite to that at which pinion 69 meshes with drive gear 25, the front wheels 34 and 35 are driven in the same direction.

As shown in Fig. 3, the transmissions in the cases 58 and 59 each comprise a system of gearing with a pair of sliding clutches 88 and 89 in one and 90 and 91 in the other case, said clutches as shown having capacity for a neutral position wherein the transmission is inoperative and four active positions in coöperation with clutches 92, 93, 94, and 95 in the transmission of case 59 and in coöperation with clutches 96, 97, 98, and 99 of the transmission in case 58.

Means for controlling or actuating the corresponding clutches in the two transmissions simultaneously comprises a single control lever 100 journaled to operate fully upon a shaft 101 journaled on brackets 102 and 103 secured to casings 58 and 59. Fast on the shaft 101 is a lever 104 adapted to receive lever 100 when the same is swung to one position. Extending from shaft 101 are arms 105 and 106. Arm 105 is connected by a link 107 with a slide 109 extending through transmission case 59 and having connection by a fork 110 with clutch 88. Arm 106 is connected by a link 108 with a slide 111 extending through transmission case 58 and connected by a shifter yoke 112 with clutch 90 corresponding in position to clutch 88. When, therefore, the lever 100 is engaged with lever 104 and the same is oscillated, clutches 88 and 90 of the two transmission cases will be simultaneously actuated.

A second lever 113 is fast on a sleeve 114 journaled upon shaft 101, said lever 113 being adapted to be engaged by control lever 100. The sleeve 114 has fast thereon an arm 115 connected by a link 116 with a slide 117 extending within transmission case 58 and connected by a shifter fork 118 with clutch 91. Sleeve 114 also has fast thereon an arm 119 connected by a link 120 with a slide 121 extending within transmission casing 59 and connected by a shifter fork 122 with clutch 89, corresponding in position to clutch 91. When, therefore, the control lever 100 is engaged with lever 113 and the same is actuated the clutch member 89 of transmission 59 and clutch member 91 of transmission 58 will be simultaneously actuated to effect simultaneous and similar operation of the corresponding transmission elements controlled by clutches 89 and 91 of the two transmissions 59 and 58. From the above, it will be apparent that means are provided for simultaneously and correspondingly controlling the independent transmissions of the two motor units.

In the construction illustrated in Figs. 2 and 7, the engine units comprise four sets of block castings 123, 124, 125, and 126 each comprising two cylinders severally spaced one from the other, as clearly indicated in Fig. 2. A single carbureter 127 feeds through an intake pipe 128 to a single manifold 129, positioned between the engine units and connected thereto on either side, as best shown in Figs. 2 and 7. Separate exhaust manifolds 130 and 131 are connected to the respective engine units involving blocks 124, 125, and 123, 126, respectively, and a single water circulation for each of said engine blocks is provided in a pipe system 132, 133, 134. Although the two engine units may be conveniently cast in four blocks, as here shown, a single crank casing 135 in which the two crank shafts 136 and 137 operate may be advantageously employed requiring but a single oiling system for the two engine units. It is practicable also to cast the two engine units with four or more cylinders for each unit in a single block, if desired.

As shown in Figs. 2 and 5 the crank shafts 137 and 136 connect through the transmission shafts 60 and 61 with transmissions housed in a single case 138 the two transmissions being provided with sliding clutches 88, 89 coöperating with clutch members 92, 93, 94, 95 of one transmission and with sliding clutch members 90 and 91 coöperating with clutch members 96, 97, 98, 99 for effecting the usual change of speed forward and reverse. The single control 100 is journaled upon a fixed shaft 139 supported on brackets 140, 141 secured to the wall of casing 138. At one side of lever 100 is journaled a lever 142 adapted to be connected with lever 100 and having a depending portion 143 connected by a link 144 with a slide 145 extending through housing 138 as shown in Fig. 6. The slide 145 has fast thereon a hub 146 which is connected by oppositely extended forks 147 and 148 with the corresponding slide clutches 88 and 90 of the two transmissions. A second lever 149 is journaled beside control lever 100 and adapted to be connected therewith and has connected to a depending portion thereof a link 150 which is connected to a slide 151 extending through transmission cases 138 between the two sets of transmissions. Secured to the slide 151 is a hub 152 having oppositely extended shifter forks 153 and 154 for shifting corresponding clutch members 89 and 91 of the two transmissions. It will be apparent that the above construction provides means for simultaneously shifting corresponding members of the two transmissions so as to control said two transmissions as a unit.

The advantages of my invention are obvious. By its employment a highly efficient drive for four wheel vehicles is obtained. No differential is required as the compression of either engine will take care of the variations of speed of the wheels at the respective sides of the vehicles in turning curves. Furthermore, each engine unit will pull independently upon its side. Since it is generally the case that bad spots in roadways or other driving surfaces affect a wheel or the wheels at one side only, the undivided pulling power of a complete engine unit upon wheels having a good footing, without any differential to prevent slippage, provides effective means against the stalling of a vehicle. The invention is, therefore, particularly applicable to motor vehicles designed to carry heavy loads such as trucks, but also is applicable to all forms of motor vehicles including pleasure cars.

I claim:

1. A motor vehicle comprising a frame and pairs of front and rear wheels supporting the same, two independent motor units on said frame, driving connections from one motor unit to the front and rear wheel on one side, and driving connections from the other motor unit to the front and rear wheels on the other side.

2. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, and a single carbureter and control therefor for both said engine units.

3. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, independent clutches for each of said engine units, and a single control element for simultaneously operating said clutches.

4. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, independent sets of transmission elements for each of said motor units, and a single control member for simultaneously actuating said transmission elements.

5. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, a single carbureter and control therefor for both said engine units, independent clutches for each of said engine units, a single control element for simultaneously operating said clutches, independent sets of transmission elements for each of said motor units, and a single control member for simultaneously actuating said transmission elements.

6. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, a single carbureter and control therefor for both said engine units, and independent clutches for each of said engine units.

7. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, a single carbureter and control therefor for both said engine units, independent sets of transmission elements for each of said motor units, and a single control member for simultaneously actuating both said transmission elements.

8. A motor vehicle comprising a frame and pairs of front and rear wheels supporting the same, two independent motor units on said frame, driving connections from one motor unit to the front and rear wheel on one side, driving connections from the other motor unit to the front and rear wheels on the other side, independent clutches for each of said engine units, a single control element for simultaneously operating said clutches, independent sets of transmission elements for each of said motor units and a single control member for simultaneously actuating both said transmission elements.

9. A motor vehicle comprising a frame and rigid front and rear axles, steering knuckles on the front axle, wheels journaled on the ends of the rear axle and on the steering knuckles, two independent motor units carried by the frame, independent driving connections including separate rear drive shafts housed in said rear axle from said engine units to drive the two rear wheels independently and separate driving connections from each of said first named connections to the front wheels.

10. A motor vehicle comprising a frame having a hollow rear axle, a pair of wheels journaled on said axle, two independent motor units carried by the frame, independent driving connections from each of said engine units including separate rear drive shafts housed in said rear axle to drive the two rear wheels independently, a pair of steering wheels at the front of the frame, and means for driving one of said steering wheels by one engine unit and the other steering wheel by the other engine unit.

11. A motor vehicle comprising a frame and rigid front and rear axles, steering knuckles on the front axle, wheels journaled on the ends of the rear axle and on the steering knuckles, two independent motor units carried by the frame, independent driving connections from said engine units including separate rear drive shafts housed in said rear axle to drive the two rear wheels independently, and forwardly extending shafts having driving connection with said first named shafts and with the two steering wheels.

12. A motor vehicle comprising a frame and rigid front and rear axles, steering knuckles on the front axle, wheels journaled on the ends of the rear axle and on the steering knuckles, two independent motor units carried by the frame, independent driving connections from said engine units including separate rear drive shafts housed in said rear axle to drive the two rear wheels independently, each of said drive shafts having a drive gear fast therewith, and separate driving shafts having driving connection with each of the said steering wheels and having pinions meshing with each of said gears, the meshing point of the pinion and gear of one of said steering-wheel driving shafts being diametrically opposite the meshing point of the pinion and gear for the other steering-wheel driving shaft.

13. A motor vehicle comprising a frame having a hollow rear axle, a pair of wheels journaled on said axle, two independent motor units carried by the frame, a single transmission case having two independent transmissions therein, means for driving each of said rear wheels from said independent transmissions including separate gear drive shafts housed in said rear axle, and a single control member for clutching or unclutching both said transmissions simultaneously.

14. A motor vehicle comprising a frame and a pair of drive wheels, two independent motor units carried by the frame, a single transmission case having therein a separate transmission for each of said engine units, means for driving each of said drive wheels independently from each of said separate transmissions, respectively, and a single control member for simultaneously clutching or unclutching said transmissions.

15. A motor vehicle comprising a frame and a pair of drive wheels, two independent motor units carried by the frame, a clutch member for each engine unit, and a single shaft lever for simultaneously controlling both said clutch members, a single transmission case carried by the frame and having therein a separate transmission for each of said engine units, said transmissions being operated by the engine through said clutch members, means for driving said drive wheels independently from said separate transmissions, respectively, and a single control member for simultaneously clutching or unclutching said transmissions.

16. A motor vehicle comprising a frame and a pair of drive wheels, two independent motor units carried by the frame, a single transmission case having therein a separate transmission for each of said engine units, means for driving said drive wheels independently from said separate transmissions, respectively, a slide operative in the transmission case between said transmissions and having connections therewith for actuating the transmissions simultaneously, and a manually controlled member for operating the slide.

17. A motor vehicle comprising a frame and a pair of drive wheels, two independent vertical cylinder motors carried parallel with one another upon the frame and having parallel crank shafts, clutches for each of said crank shafts and separate and parallel transmissions operated by each of said crank shafts through said respective clutches, means for driving said drive wheels independently from said separate transmissions, respectively, a single control member for simultaneously operating said clutches, and a single control member for simultaneously operating said transmissions.

18. A motor vehicle comprising a frame and a pair of drive wheels, two independent vertical cylinder motors carried parallel with one another upon the frame and having parallel crank shafts and a single crank case for both of said shafts, a single carbureter and a single control therefor and manifold connections therefrom for uniformly supplying explosive mixture to each cylinder of both engines, and means for driving each of said drive wheels independently from said independent motor units, respectively.

19. A motor vehicle comprising a frame and a pair of drive wheels, two independent vertical cylinder motors carried parallel with one another upon the frame and having parallel crank shafts, an intake manifold located between the engines and connected with each cylinder thereof, a single carbureter and a single control therefor, having connections with said manifold for supplying explosive mixture uniformly to each of said cylinders, and driving connections from one of said engine units to one drive wheel and driving connection from the other engine unit to the other drive wheel.

20. A motor vehicle comprising a frame and a pair of drive wheels, two independent vertical cylinder motors carried parallel with one another upon the frame and having parallel crank shafts, an intake manifold located between the engines and connected with each cylinder thereof, a single carbureter and a single control therefor, having connections with said manifold for supplying explosive mixture uniformly to each of said cylinders, driving connections from one of said engine units to one drive wheel and driving connections from the other engine unit to the other drive wheel, and means for simultaneously controlling the driving connections from both said engines to effect uniform drive of both drive wheels.

In testimony whereof I affix my signature.

JOSEPH L. WARE.